(12) United States Patent
Yuasa

(10) Patent No.: US 7,741,953 B2
(45) Date of Patent: Jun. 22, 2010

(54) WIRELESS DEVICE, WIRELESS CONTROL SYSTEM AND WIRELESS CONTROL METHOD

(75) Inventor: Tomokazu Yuasa, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 12/330,247

(22) Filed: Dec. 8, 2008

(65) Prior Publication Data

US 2009/0289758 A1 Nov. 26, 2009

(30) Foreign Application Priority Data

May 20, 2008 (JP) ............................. 2008-132061

(51) Int. Cl.
*G05B 19/00* (2006.01)
(52) U.S. Cl. ..................... 340/5.8; 340/5.1; 340/825.22
(58) Field of Classification Search .................. 340/5.8, 340/5.61, 5.65, 825.22, 5.1, 10.1, 10.4
See application file for complete search history.

(56) References Cited

U.S. PATENT DOCUMENTS 6,069,672 A * 5/2000 Claassen ..................... 348/734

7,027,881 B2 4/2006 Yumoto et al.
2005/0256590 A1 11/2005 Choi
2008/0088474 A1 * 4/2008 Hardacker et al. ..... 340/825.72

FOREIGN PATENT DOCUMENTS

| JP | 2003-143670 | 5/2003 |
|---|---|---|
| JP | 2005-080006 | 3/2005 |
| JP | 2005-210576 | 8/2005 |

* cited by examiner

*Primary Examiner*—Brian A Zimmerman
*Assistant Examiner*—Yong Hang Jiang
(74) *Attorney, Agent, or Firm*—Blakely, Sokoloff, Taylor & Zafman LLP

(57) ABSTRACT

According to one embodiment, a wireless control system having an electronic device with a wireless communication function and a remote control module for remotely operating the electronic device, wherein the remote control module includes a control module. A control module configured to transmit a authentication information to a other device via a proximity communication module and receive remote control command information for remotely operating the other device from the other device via the proximity communication module so as to store it in a storage module in order to allow the other device to start a process for establishing wireless connection with the electronic device based on the authentication information.

10 Claims, 3 Drawing Sheets

WIRELESS DEVICE, WIRELESS CONTROL SYSTEM AND WIRELESS CONTROL METHOD

CROSS-REFERENCE TO RELATED APPLICATIONS

This application is based upon and claims the benefit of priority from Japanese Patent Application No. 2008-132061, filed May 20, 2008, the entire contents of which are incorporated herein by reference.

BACKGROUND

1. Field

One embodiment of the present invention relates to a wireless connecting technique, and particularly relates to a wireless device, a wireless control system and a wireless control method which can easily make wireless connection for which authentication is required.

2. Description of the Related Art

In general, a wireless communication function is increasingly contained in various devices so that the devices can be installed more flexibly. When the devices which contain the wireless communication functions are wirelessly connected to each other, a wireless authenticating operation should be set in advance. In this case, various methods for realization can be used, according to the wireless standard to be used. In the case of wireless LAN, switches provided to both devices are pressed so that authentication is conducted. In the case of wireless USB, both devices are connected physically by a USB cable so that authentication information is exchanged and authentication is conducted. Remote operation commands of the devices are stored in a remote control module in advance, and the devices are remotely controlled by using the stored remote operation commands. In this case, when a new device is operated by the remote control module, a remote operation command of the new electronic device is registered in the remote control module so that the new electronic device can be operated. For example, Jpn. Pat. Appln. KOKAI Publication No. 2003-143670 discloses a technique in which a remote operation command is transmitted from a new electronic device to be operated to a remote control module and the new electronic device is operated by the remote control module.

However, when the device which is controlled by the remote control module is wirelessly connected to another device by using the technique disclosed in Jpn. Pat. Appln. KOKAI Publication No. 2003-143670, the user should go to the device and operate it. When this device is very large and heavy, or when the device is installed in a place where the user cannot work easily, the setting becomes very difficult. Normally, the remote control module is attached to the respective devices, but the user should operate them separately, and when the number of devices to be used increases, the operation becomes very complicated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings In general, according to one embodiment of the invention, a wireless control system having an electronic device with a wireless communication function and a remote control module for remotely operating the electronic device, wherein the remote control module includes: a remote communication module configured to remotely operate the electronic device; a storage module configured to store authentication information including information for identifying the electron device and for wirelessly connecting to the electronic device; a proximity communication module configured to perform proximity communication between the electronic device and another device having the wireless communication function of the same wireless standard as that of the electronic device; and control module configured to transmit the authentication information to the other device via the proximity communication module and receive remote control command information for remotely operating the other device from the other device via the proximity communication module so as to store it in the storage module in order to allow the other device to start a process for establishing wireless connection with the electronic device based on the authentication information.

An embodiment of the present invention will be described below with reference to the drawings.

Figure 1:
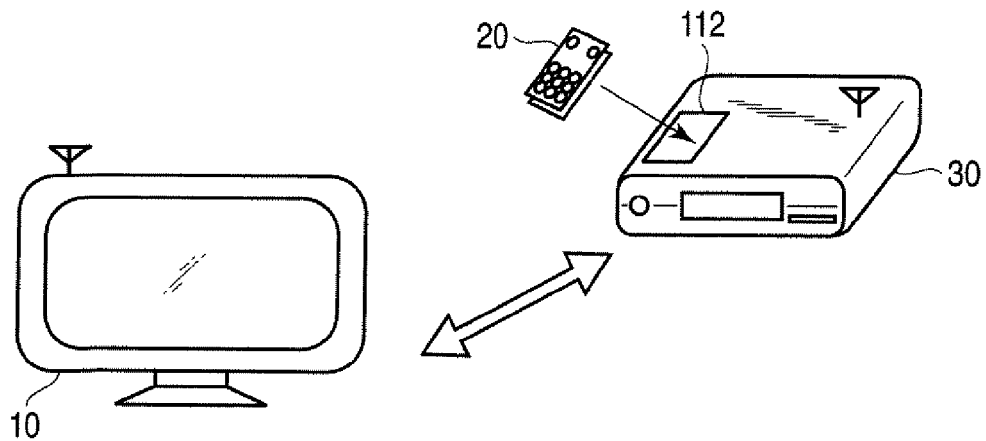
FIG. 1 is an exemplary diagram illustrating an outline of a wireless control system according to one embodiment of the present invention.

FIG. 1 is a diagram illustrating an outline of a wireless control system according to one embodiment of the present invention.

The wireless control system includes a television (electronic device) 10 and a remote control module 20. Further, the system includes a DVD player (another device: wireless device) 30. The remote control module 20 is a dedicated controller attached to the television 10. The remote control module 20 can add remote operation commands (remote command information), and stores a remote operation command of another device such as the DVD player 30 therein so as to be capable of remotely controlling it. In this embodiment, the television 10 and the DVD player 30 are used, but the electronic device is not limited to them, and thus this embodiment can be applied to any devices (for example, a wireless device A and a wireless device B) as long as they make wireless connection using a wireless communication system for which authentication is required at the time of the connection (for example, wireless LAN, wireless USB, wireless HD).

The television 10 and the DVD player 30 have a wireless connecting function, and after they authenticate wireless connection so as to establish the wireless connection, they can transmit/receive video signals or the like by module of the wireless communication. The remote control module 20 is a remote control module which operates the television 10, and stores the remote operation command of the television 10 in advance therein. The remote control module 20 can transmit/receive data via proximity communication of the DVD player 30, such as a wireless IC tag reader/writer 112. In the case of the proximity communication, a contact or non-contact communication system can be used besides the wireless IC tag. For example, data may be transmitted/received by using a cable. The remote control module 20 stores authentication information for wireless connection to the television 10 therein. The authentication information includes information for identifying the television 10 and is for the wireless connection to the television 10, and varies according to a connection system (described later: see FIG. 3). When the authentication information is transmitted to the DVD player 30, the DVD player 30 can wirelessly communicate with the television 10. The remote control module 20 receives a remote operation command so as to be capable of remotely operating a new device. The remote control module 20 has a liquid crystal panel containing a touch sensor, for example, and an operation button of a new device may be added to and displayed on the liquid crystal panel.

Figure 2:
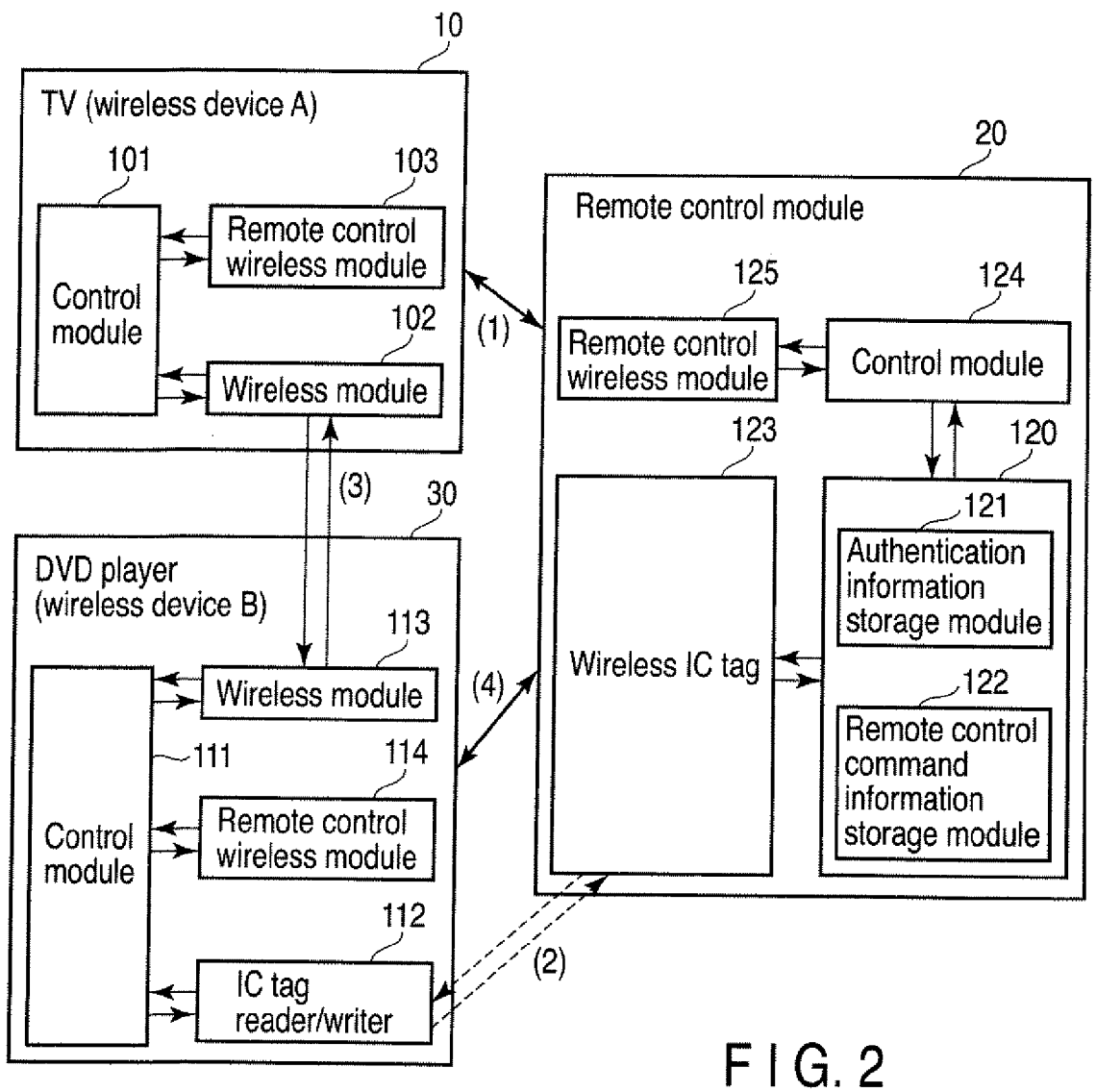
FIG. 2 is an exemplary block diagram illustrating a main constitution of the wireless control system according to one embodiment of the present invention.

FIG. 2 is a block diagram illustrating a connection relationship of the wireless control system. The television (wireless device A: electronic device) 10 has a control module 101, a wireless module (first wireless communication function) 102, and a remote control wireless module 103. The control module 101 controls transmission/reception of a remote operation command to/from the remote control module 20 via the remote control wireless module 103, and controls transmission/reception of video signals to/from another device such as the DVD player (wireless device B: another device or wireless device) 30 via the wireless module 102. The wireless module (first wireless communication function) 102 is a wireless communication function. This connection system of the wireless communication function, performs communication according to wireless standards such as wireless LAN, wireless USB and wireless HD (the connection system which is suitable for contents is selected). The remote control wireless module 103 receives the remote operation command from the remote control module 20 so as to transmit it to the control module 101.

Figure 3:
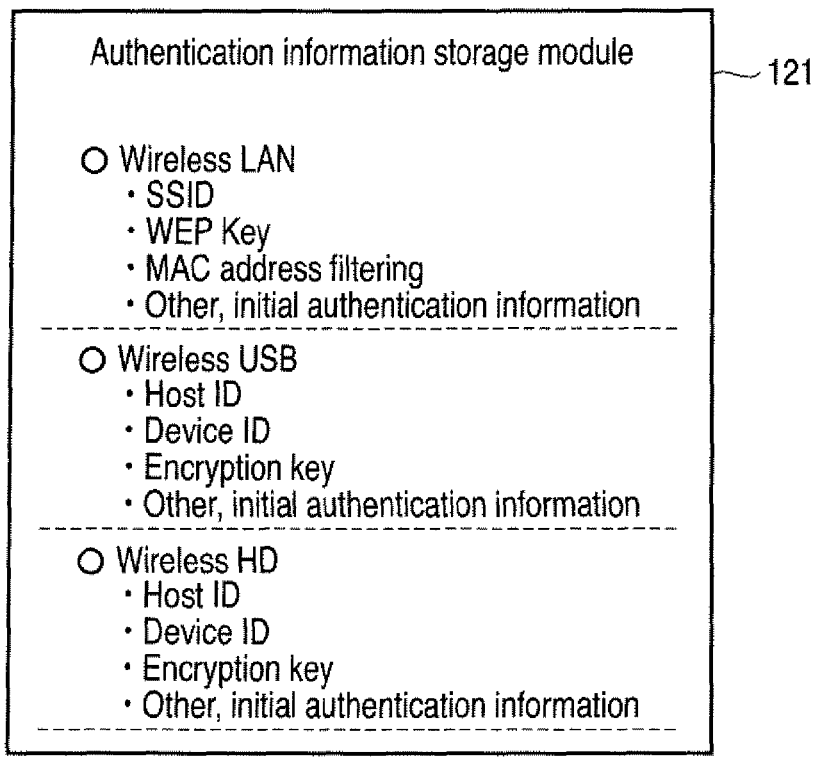
FIG. 3 is an exemplary conceptual diagram illustrating one example of authentication information about television stored in a remote control module in advance according to one embodiment of the present invention.

The remote control module 20 includes a storage module 120, a wireless IC tag (proximity communication module) 123, a control module (control module) 124, and a remote control wireless module (remote communication module) 125. The storage module 120 has an authentication information storage module 121 and a remote command information storage module 122. The authentication information storage module 121 stores authentication information in the case where another device (for example, the DVD player 30) is wirelessly connected to the television 10. The authentication information is information for necessary authentication in the case where wireless connection is established. As shown in FIG. 3, for example, the authentication information storage module 121 stores the following information. When the connection system is wireless LAN, the authentication information is SSID (Service Set Identifier), WEP (Wired Equivalent Privacy) key, MAC (Media Access Control) address filtering, and other initial authentication information. When the connection system is wireless USB, the authentication information is host ID, device ID, encryption key, and other initial authentication information. When the connection system is wireless HD, the authentication information is host ID, device ID, encryption key and other initial authentication information. When such authentication for the wireless connection is conducted, even if devices having the same model number are present in one place, they can be used without crossed lines.

The wireless IC tag 123 is a wireless device which performs proximity wireless communication. When the wireless IC tag 123 is moved closer to an opposing communication device, data can be transmitted/received therebetween. The control module 124 executes a process for transmitting the remote operation command to the television 10, a process for transmitting the authentication information about the television 10 to the wirelessly connected device (for example, the DVD player 30) via the wireless IC tag 123, and a process for receiving the remote operation command from the wirelessly connected device (for example, the DVD player 30) so as to store it in the remote control command information storage module 122. The remote control wireless module 125 is a communication device which transmits the remote operation command to the television 10.

The DVD player 30 has a control module (control module) 111, an IC tag reader/writer (proximity communication module) 112, the wireless module (second wireless communication function) 113 and a remote control wireless module 114. The control module 111 performs control so as to receive the authentication information from the remote control module 20 via the IC tag reader/writer 112 and transmit the remote operation command of the DVD player 30 to the remote control module 20. The control module 111 is wirelessly connected to the television 10 via the wireless module 113 based on the received authentication information. Further, the control module 111 performs control so as to receive the remote operation command from the remote control module 20 via the remote control wireless module 114. The authentication information is information for authenticating the wireless connection requiring authentication, and varies according to the connection system of the wireless connection (described later, see FIG. 3). The IC tag reader/writer 112 is a communication device which has the same wireless standard as that of the wireless IC tag 123 of the remote control module 20, and transmits/receives information. The wireless module 113 is a communication device which is wirelessly connected to the television 10, and has the same wireless standard as that of the wireless module 102 of the television The remote control wireless module 114 is a communication device which receives a remote operation command from the remote control module 20. The control module 111 stores authentication information in the case where another device is wirelessly connected to the television 10 and the remote control module 20.

Figure 4:
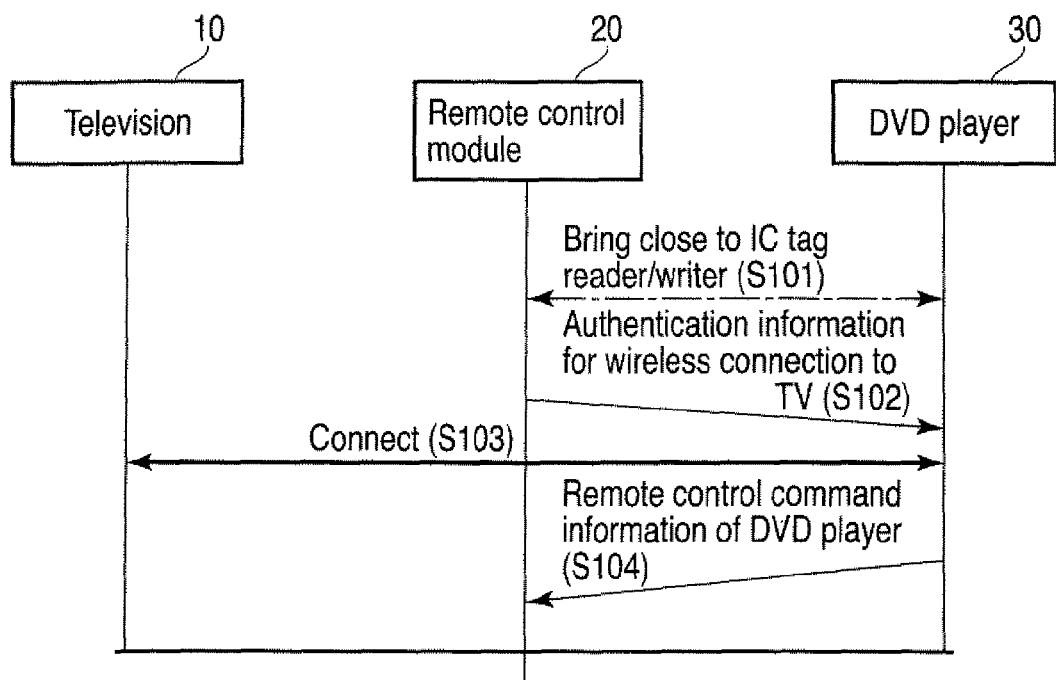
FIG. 4 is an exemplary flow chart describing a process at the time of connection in a wireless control method for electronic devices according to one embodiment of the present invention.

A wireless control method to which the wireless control system and the wireless device are applied according to one embodiment of the present invention having the above structures is described below with reference to FIG. 4.

A user moves the remote control module 20 close to the IC tag reader/writer 112 of the DVD player 30 (block S101). In this case, the remote control module 20 may be brought into contact with the IC tag reader/writer 112 of the DVD player 30. In the case of cable connection or the like, the remote control module 20 is connected to the DVD player 30 by a cable. The control module 124 of the remote control module 20 reads the previously stored authentication information about the television 10 from the authentication information storage module (see FIG. 3) 121, and transmits it to the DVD player 30 via the wireless IC tag 123 (or cable; the example of cable is omitted hereinafter) (block S102).

When the DVD player 30 receives the authentication information about the television 10 (see FIG. 3) via the IC tag reader/writer 112, it establishes wireless connection with the television 10 based on the received authentication information (block S103). In this case, the DVD player 30 tries to connect to the television 10 using the received authentication information. For example, when the connection system is wireless LAN, the DVD player 30 searches for the television 10 based on information such as SSID or WEP key, and tries to connect to the searched television 10. For example, when the authentication information received by the DVD player 30 relates to three connection systems, wireless LAN, wireless USB and wireless HD, the DVD player 30 establishes connections based on the three connection systems. When a transmission speed of data necessary for contents to be transmitted from the DVD player 30 to the television 10 is known in advance, a connection system suitable for the contents (the transmission speed at which the data about the contents can be sufficiently transmitted) is picked up, so that the connection using only the picked-up connection system may be established. In another manner, the connections of all the connection systems are established, and the connecting system suitable for the contents may be selected to be used at a stage of contents reproduction.

When the DVD player 30 establishes the wireless connection with the television 10, it transmits a remote operation command for remote operation of the DVD player 30 to the remote control module 20 via the IC tag reader/writer 112 (block S104).

The remote control module 20 stores the received remote operation command in the remote control command information storage module 122. According to this embodiment, the timing of the transmission of the remote operation command from the DVD player 30 to the remote control module 20 is after the connection between the DVD player 30 and the television 10 is established. However, the timing is not limited to this, and the remote operation command may be transmitted from the DVD player 30 to the remote control module 20 simultaneously with the reception of the authentication information by the DVD player 30 from the remote control module 20.

When the connection between the DVD player 30 and the television 10 is established, a sound may be played, an LED may be turned on, or the connection may be displayed on a display or the like of the DVD player 30 so that the user easily recognizes the establishment of the connection.

Figure 5:
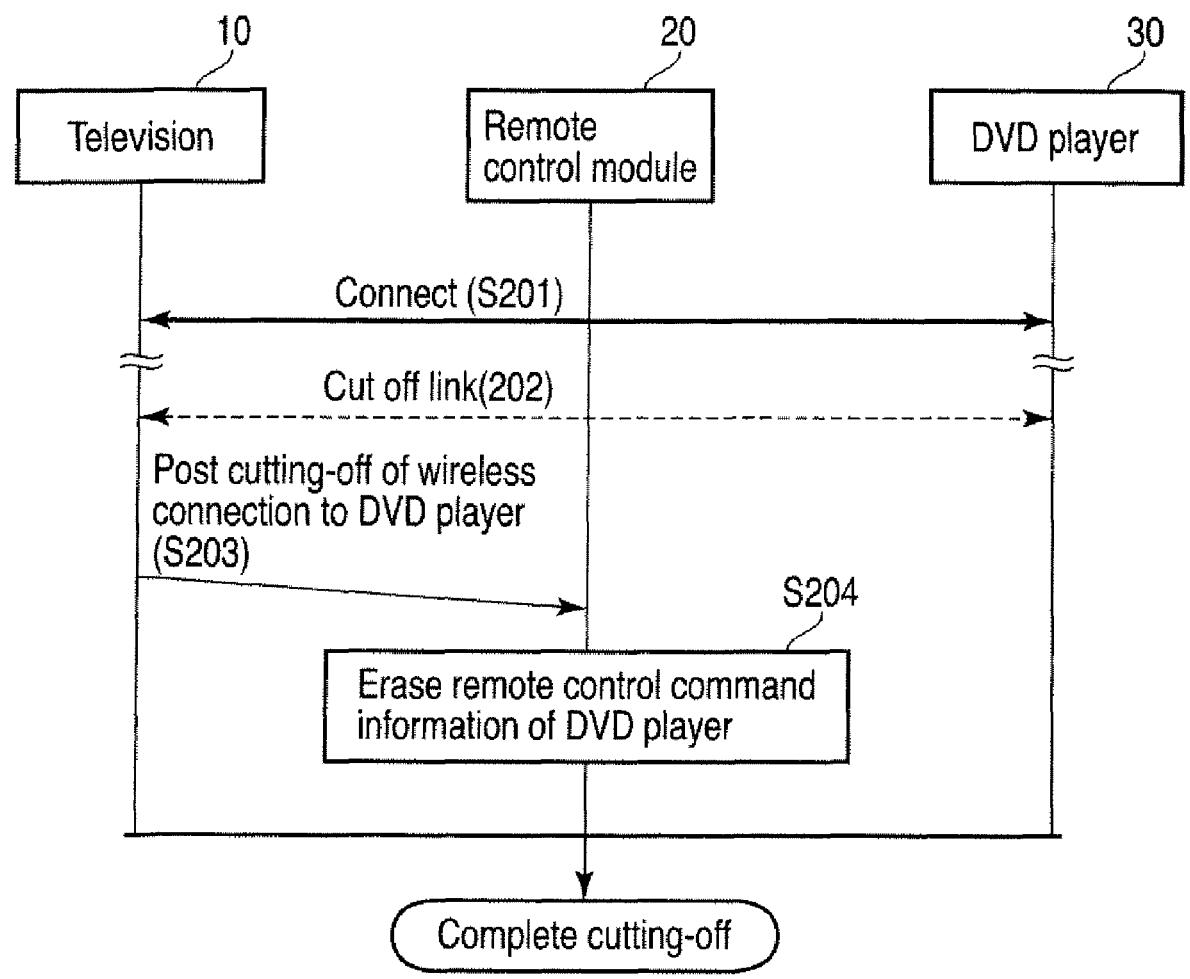
FIG. 5 is an exemplary flow chart describing a process for cutting off the connection in the wireless control method for electronic devices according to one embodiment of the present invention.

A process in the case where the connection between the television 10 and the DVD player 30 is cut off is described below with reference to FIG. 5.

When the television 10 is wirelessly connected to the DVD player 30 (block S201), the control module 101 of the television 10 monitors the wireless connection between the television 10 and the DVD player 30.

When the control module 101 of the television 10 determines that information transmitted from the DVD player 30 by the wireless communication stops for a predetermined period, it determines that the wireless connection between the DVD player 30 and the television 10 is cut off (block S202). When the television 10 determines that the wireless connection between the DVD player 30 and the television 10 is cut off, it posts the cutting-off of the wireless connection with the DVD player 30 to the remote control module 20 (block S203). When receiving the post of the cutting-off of the wireless connection, the remote control module 20 erases the remote operation command stored in the remote control command information storage module 122 of the remote control module 20 (block S204). When the remote operation command is stored in the remote control command information storage module 122 of the remote control module 20, protection can be set. When the remote operation command is protected so as to be stored in the remote control command information storage module 122, it is not erased (at the time when the remote control module 20 receives the post of the cutting-off of the wireless connection, it determines whether the remote operation command is protected). The protected remote operation command is not to be erased, and is maintained in the remote control command information storage module 122. When a device (DVD player or the like) is frequently used, even if the wireless connection is cut off, it is expected to be used. For this reason, the remote operation command is not erased, so as to be kept.

When the remote operation command is erased, it can be erased by operating a stand-alone button of the remote control module 20, without being limited to the above embodiment. According to the embodiment, all remote operation commands which are not protected are erased, but setting can be arbitrarily changed in such a manner that when the capacity of the storage module in the remote control module 20 becomes insufficient, the remote operation command is erased. When the determination is made that the wireless connection between the DVD player 30 and the television 10 is cut off, this case corresponds to a case where the wirelessly connected devices (television 10 and the DVD player 30) are separated by not less than a communicable distance, a case where a shielding material which shields a radio is present between the wirelessly connected devices, or a case where the power source(s) of any one or both of the wirelessly connected devices is (are) turned off.

It is an object of the present invention to provide a wireless device, a wireless control system and a wireless control method which can improve user's convenience. A module can be accomplished in software and hardware.

According to the embodiment, the wireless connection can be easily established by transmitting/receiving authentication information via the remote control module 20 without connecting the wirelessly connectable devices by cable for which authentication is required. At the same time, the device with which the wireless connection is established can set a remote operation of a device which could not be remotely operated by the remote control module 20. According to the embodiment, the wireless connection between the DVD player 30 and the television 10 is started by the communication between the remote control module 20 and the IC tag reader/writer 112 of the DVD player 30. However, the wireless communication is not limited to this and may be started by pressing a predetermined button.

A module can be accomplished in software and hardware.

The present invention is not directly limited to the above embodiment. The present invention can be embodied by changing components without departing from the gist.

The plurality of components disclosed in the above embodiment are suitably combined so that various inventions can be formed. For example, some components may be deleted from the components in the embodiment. Further, the components in different embodiments may be combined suitably.

While certain embodiments of the inventions have been described, these embodiments have been presented by way of example only, and are not Intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless control system having an electronic device with a wireless communication function and a remote control module for remotely operating the electronic device, wherein the remote control module comprising:
 a remote communication module configured to remotely operate the electronic device;
 a storage module configured to store authentication information including information for identifying the electronic device and for wirelessly connecting to the electronic device;
 a proximity communication module configured to perform proximity communication with an another device having the wireless communication function of the same wireless standard as that of the electronic device; and
 a control module configured to transmit the authentication information to said another device via the proximity communication module in order to allow said another device to start a process for establishing wireless connection with the electronic device based on the authentication information and receive remote control command information for remotely operating said another device from said another device via the proximity communication module so as to store the remote control command information in the storage module.

2. The wireless control system of claim 1, wherein when the wireless connection between said another device and the electronic device is cut off, the electronic device posts the cutting-off to the remote control module, and when receiving the post of the cutting-off, the control module of the remote control module deletes the remote control command information stored in the storage module.

3. The wireless control system of claim 2, wherein when transmission of a wireless signal from said another device to the electronic device is stopped for a predetermined period, the electronic device determines that the wireless connection between said another device and the electronic device is cut off.

4. The wireless control system of claim 2, wherein when receiving the post of the cutting-off, the control module determines whether the remote control command information stored in the storage module is protected, and when the remote control command information is protected, the remote control command information is not erased so as to be maintained in the storage module.

5. A wireless device capable of wirelessly communicating with an electronic device, comprising:
 a proximity communication module configured to perform proximity communication with a remote control module for remotely operating the electronic device; and
 a control module configured to perform proximity communication with the remote control module via the proximity communication module so as to receive authentication information including information for identifying the electronic device and for wirelessly connecting to the electronic device from the remote control module, start a process for establishing wireless connection with the electronic device based on the received authentication information and transmit remote control command information for remotely operating the wireless device to the remote control module via the proximity communication module.

6. A wireless control system comprising an electronic device with a wireless communication function, a remote control unit for remotely operating the electronic device and a wireless device with a wireless communication function of the same wireless standard as that of the electronic device, wherein the remote control unit comprising:
 a remote communication module configured to remotely operate the electronic device;
 a storage module configured to store authentication information including information for identifying the electronic device and for wirelessly connecting to the electronic device;
 a proximity communication module configured to perform contact or non-contact proximity communication with the wireless device; and
 a control module configured to transmit the authentication information to the wireless device via the proximity communication module in order to allow the wireless device to start a process for establishing wireless connection with the electronic device based on the authentication information, and receive remote control command information for remotely operating the wireless device from the wireless device via the proximity communication module so as to store the remote control command information in the storage module.

7. The wireless control system of claim 6, wherein when the wireless connection between the wireless device and the electronic device is cut off, the electronic device posts the cutting-off to the remote control module, and when receiving the post of the cutting-off, the control module of the remote control unit erases the remote control command information stored in the storage module.

8. The wireless control system of claim 7, wherein when transmission of wireless signals from the wireless device to the electronic device is stopped for a predetermined period, the electronic device determines that the wireless connection between the wireless device and the electronic device is cut off.

9. The wireless control system of claim 7, wherein when receiving the post of the cutting-off, the control module determines whether the remote control command information stored in the storage module is protected, and when the remote control command information is protected, the remote control command information is not erased so as to be maintained in the storage module.

10. A wireless control method used in a wireless control system comprising an electronic device with a wireless communication function and a remote control module for remotely operating the electronic device, the remote control module includinci (i) a storage module configured to store authentication information including information for identifying the electronic device and for wirelessly connecting to the electronic device, and (ii) a proximity communication module configured to perform contact or non-contact proximity communication with an another device having a wireless communication function of the same wireless standard as that of the electronic device, the wireless control method comprising:
 transmitting, by the remote control module, the authentication information to said another device via the proximity communication module in order to allow said another device to start a process for establish mci wireless connection with the electronic device based on the authentication information, and
 receiving, by the remote control module, remote control command information for remotely operating said another device from said another device via the proximity communication module so as to store the remote control command information in the storage module.

* * * * *